Aug. 11, 1953     A. H. CANADA     2,648,249
FREQUENCY MODULATED PHOTOMETER
Filed Feb. 28, 1948
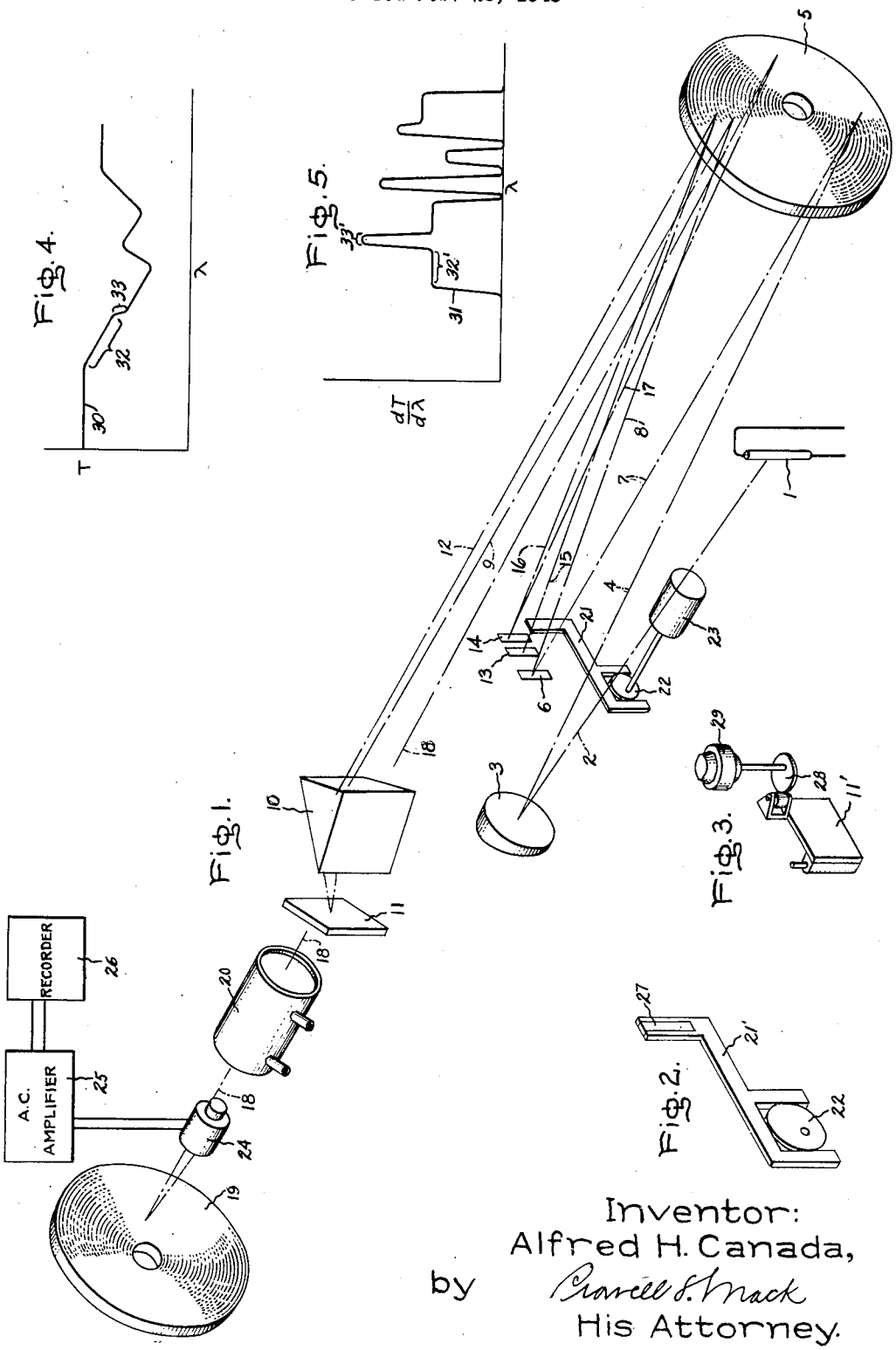
Inventor:
Alfred H. Canada,
by Crowell S. Mack
His Attorney.

Patented Aug. 11, 1953

2,648,249

UNITED STATES PATENT OFFICE 2,648,249

FREQUENCY MODULATED PHOTOMETER

Alfred H. Canada, Schenectady, N. Y., assignor to General Electric Company, a corporation of New York Application February 28, 1948, Serial No. 11,962

3 Claims. (Cl. 88—14)

My invention relates to photometers, and particularly to an improved absorption photometer in which the wavelength of the light employed is varied rapidly back and forth over a narrow band.

The object of my invention is to provide an improved absorption photometer adapted to determine the composition of substances from their light absorption bands, in which the absorbed light beam is frequency modulated, that is, varied in wavelength rapidly back and forth over a narrow band, for measuring the slope of the transmission curve.

Instruments, herein called "absorption photometers," have been built which measure the absorption of light by a sample to be analyzed. For example, the sample may be a gas through which a beam of monochromatic light is directed. In passing through the gas, a part of the light is absorbed and the remainder is transmitted to a suitable detector. In a type of such instruments known as "spectrophotometers," the wavelength of the monochromatic beam may be swept through a relatively wide range, and a curve of light transmission versus wavelength may be obtained. Such a transmission curve usually has a number of troughs which correspond to the absorption bands of the sample.

It has been found that small changes in slope of the transmission curve along the side of an absorption band often provide the best indication of deviation from a standard condition of the sample. It is often difficult, and sometimes impossible, to detect these slope variations in a conventional transmission curve, because the steepness of the curve along sides of absorption bands may obscure small variations in slope, and also because the slope varies from point to point along the curve, which makes the accurate measurement of slope difficult compared to the measurement of ordinate values.

In this invention, the wavelength, and hence the frequency, of the monochromatic beam is varied rapidly over a narrow range which corresponds to a portion along one side of a single absorption band, and detecting means is provided which responds to variations in light transmission within this narrow range. An indication is thus obtained which is proportional to the average slope of the transmission curve within a narrow range of wavelengths, from which small changes in average slope of this portion of the transmission curve can be detected readily. It will be appreciated that this indication differs from that obtained with a conventional spectrophotometer, where the wavelength is swept over a wide range including a number of absorption bands, in that this invention provides means for directly obtaining ordinate values proportional to the slope of the transmission curve.

Because the apparatus of this invention rapidly varies or modulates the wavelength and frequency of a monochromatic light beam back and forth over a narrow range, it is herein called a "frequency-modulated photometer." The term "light" as used herein includes, in addition to visible radiations, electromagnetic radiations having wavelengths both longer and shorter than those in the visible spectrum—for example, infrared and ultraviolet radiations.

In the description that follows I have for illustration described my invention in connection with an improved photometer optical system described in my copending application S. N. 11,961, filed February 28, 1948, now Patent No. 2,605,671, issued August 5, 1952, and assigned to the same assignee as the present invention, but it will be evident to those skilled in the art that my invention may also be used with other photometer optical systems.

The features of my invention which are believed to be novel and patentable are pointed out in the claims appended hereto. For a better understanding of my invention reference is made in the following description to the accompanying drawing in which Fig. 1 is a schematic diagram of a preferred form of my invention; Figs. 2 and 3 are schematic diagrams showing alternate means of modulating the light beam in the apparatus of Fig. 1; and Figs. 4 and 5 are graphs, hereinafter more fully described, to illustrate the principle of my invention. Like reference characters refer to similar parts throughout the drawing. Optical paths are shown by light broken lines, which illustrate the mean direction of the various paths but do not represent all of the individual light rays.

Referring now to Fig. 1, a polychromatic light source 1 may be a source of visible light, infrared light, or ultra-violet light, as desired. Light from source 1 travels along the path represented by broken line 2 to a collimating mirror 3 which collects light rays emitted by source 1 and directs them as a beam of substantially parallel rays along the path represented by broken line 4 to a portion of principal parabolic mirror 5. Mirror 5 focuses these rays upon a small plane mirror 6 positioned substantially at the principal focus of mirror 5. The rays travel from mirror 5 to mirror 6 along the path represented by broken line 7. Mirror 6 constitutes the entrance slit of a prism monochromator as illustrated and hereinafter described. As will be understood by those skilled in the art, it is preferable that mirror 6 be narrow to insure good monochromator resolution. Mirror 6 redirects the rays along the path represented by broken line 8 to a second portion of mirror 5 from which they are again reflected as a beam of parallel rays traveling in the direction of broken line 9. These rays are refracted by a prism 10, and rays of different wavelengths are thereby dispersed. A second plane mirror 11 reflects the dispersed rays back through prism 10, where they are again refracted and further dispersed, along the path represented by broken line 12 to mirror 5 which focuses the rays to form an image of spectrum. Two small, narrow, plane mirrors 13 and 14 are located a short distance apart in different portions of this imaged spectrum and substantially at the principal focus of mirror 5. Light rays travel from mirror 5 to mirrors 13 and 14 along paths represented by broken lines 15 and 16, respectively. Thus, mirrors 13 and 14 respectively reflect light of slightly different narrow wavelength bands to mirror 5 substantially along the path represented by broken line 17. These wavelength bands are sufficiently narrow to be considered as monochromatic light and are referred to hereinafter as comprising wavelengths of light. The two mirrors, 13 and 14 constitute exit slits of a monochromator comprising mirrors 6, 11, 13 and 14, prism 10 and portions of mirror 5. The width of mirrors 6, 13 and 14, or the width of slits which may be placed immediately in front of the respective mirrors, determines the bandwidth of the two wavelength bands of light. These two wavelengths of light are reflected alternately, as hereinafter explained, as substantially parallel rays along a common path represented by broken line 18 from mirror 5 to a second parabolic mirror 19 which is axially aligned with and facing the face of mirror 5. A sample cell 20, adapted to contain the substance to be tested, is positioned in the path of these rays travelling between mirrors 5 and 19, so that light of alternating wavelength passes through the cell and is partially absorbed by the substance to be tested.

Located in front of mirrors 13 and 14 is a wavelength selector 21 adapted to obstruct rays of light reflected by one of the mirrors and to pass rays reflected by the other mirror. A cam 22, driven by a motor 23, vibrates wavelength selector 21 back and forth in front of the two mirrors so that light is transmitted from each mirror alternately. Thus the light passing through sample cell 20 is frequency modulated; that is, its wavelength is varied rapidly back and forth between the two wavelengths reflected by mirrors 13 and 14.

A light responsive detector 24 is located at the focus of mirror 19 and thus is acted upon by the unabsorbed light passing through the substance tested. Detector 24 can be a bolometer, thermopile, or other sensitive radiation detector. Detector 24 supplies an output electric signal proportional to the radiation received, and the alternating component of this signal is amplified by an A.-C. amplifier 25. This, in turn, drives a recorder 26 or other indicating instrument. Since the A.-C. component only of the detector output is transmitted by amplifier 25, the values recorded are determined by differences in the relative amounts of light by the two wave lengths transmitted through the sample, and such values are proportional to the average slope of the transmission curve of the sample between the two wave lengths employed.

It will be evident to those skilled in the art that other means may be used to vary the wavelength of the absorbed light beam without departing from the true spirit and scope of my invention. For example, the modification shown in Fig. 2 may be employed. In this form of my invention, a single small, narrow, plane mirror 27 replaces mirrors 13 and 14 of the apparatus shown in Fig. 1. Mirror 27 is mounted upon wavelength selector 21', which corresponds to selector 21, Fig. 1, and is vibrated back and forth over a small region of the spectrum by the action of cam 22.

Another means of varying the wavelength is shown in Fig. 3. In this modification, mirror 11', which corresponds to mirror 11, Fig. 1, is angularly vibrated over a very small range by a cam 28 driven by a motor 29. In the drawing, the eccentricity of cam 28 is greatly exaggerated for clearness of illustration. This causes the spectrum imaged by mirror 5 to vibrate back and forth over a small range, so that a single stationary mirror, such as mirror 13 of Fig. 1, will reflect light the wavelength of which is varied rapidly back and forth over a narrow range. In this modification, mirror 14, wavelength selector 21, cam 22 and motor 23 are omitted.

The frequency modulator shown in Fig. 1 shifts the wavelength alternately from one discrete value to another. The frequency modulators shown in Figs. 2 and 3 cause the wavelength to vary over a continuous range between the two extreme values. Either mode of operation can be made to give good results, and the operating principle of the frequency-modulated photometer is substantially the same in both cases. However, the latter mode responds to point-by-point variations in slope, which in some cases gives a better measure of slope than a comparison of the extreme points only. Therefore, the latter mode is generally preferable.

The advantages of my invention will be more apparent from an inspection of Figs. 4 and 5. Fig. 4 is a graph in which the intensity of transmitted light T is plotted against wavelength lambda over a small spectral range including an absorption band of a substance tested. This substance may, for example, be taken from an industrial process in which it is desired to hold the composition of the substance constant. Any deviations from the desired composition of the substance will cause changes in transmission curve 30. In many cases, the most significant of such changes are in the slope of portions of this curve. It is evident that in a chart such as Fig. 4, which is the type of indication obtained from a conventional spectrophotometer, small changes in slope cannot be easily detected. If, however, the photometer wavelength is varied rapidly back and forth over a small range delta lambda, the alternating component of intensity delta T is a measure of the slope of the curve, provided delta lambda is sufficiently small. In the limiting case, this becomes $$\frac{dT}{d\lambda}$$

which is plotted versus lambda in Fig. 5. It will be noted that small changes in the slope of transmission curve 30, Fig. 4, are readily detected in curve 31, Fig. 5, the ordinates of which represent approximately the output indications of my improved frequency modulated photometer.

For example, at its left-hand end curve 30, Fig. 4 is horizontal—in other words, its slope is zero. Within this region, the frequency modulated photometer indicates zero, since all wave lengths of light within the narrow range employed are absorbed equally by the sample, and consequently the A. C. output of the detector is zero. Correspondingly, the ordinates of curve 31, Fig. 5, are zero at its left-hand end. In region 32, curve 30 has a noticeable slope. The amount of this slope is indicated quantitatively by the ordinates of the curve 31 in region 32'. In this region, one wave length of the frequency modulated photometer is more strongly absorbed by the sample than the other wave length, and consequently, the intensity of light which reaches detector 24, Fig. 1, varies at the modulation frequency. This produces an A. C. component in the detector output, the value of which is indicated by recorder 26. In region 33, curve 30 has a steeper slope, and consequently the ordinates of curve 31 are greater in region 33'. It may be noted that curve 31 provides a much better quantitative indication of slope than does curve 30. Small changes in slope which would probably not be noticed in a transmission curve, such as curve 30, Fig. 4, can be detected readily in a $$\frac{DT}{D\lambda} \text{ v. } \lambda \text{ curve}$$

such as curve 31 of Fig. 5. In Fig. 5, both positive and negative slopes are indicated by positive ordinates, consequently the device may be used to examine the slope of either side of an absorption band.

In order to measure the slope of the transmission curve it is necessary that the wavelength be varied over a sufficiently narrow range that the major portion of the transmission curve within the range covered has a slope substantially the same as the average slope within that range. On the other hand, if this range is too small, delta T becomes so small that the sensitivity of the instrument is reduced. Since it is usually desirable to measure the average slope along one side of an absorption band, maximum sensitivity can be obtained by rapidly varying the wavelength of the absorbed light over a range substantially equal to one-half the width of the absorption band examined. In a typical case, this would require that the wavelength be varied over a range of about 20 wave numbers, which in the infrared region near wavelengths of 10 microns approximately equals a wavelength variation of .2 micron, but in the case of a very wide absorption band it is sometimes desirable to vary the frequency over a range as great as 100 wave numbers. The wave number is defined as the number of waves per centimeter, and is equal to the reciprocal of the wavelength in centimeters or $10^4$ times the reciprocal of the wavelength in microns. In the Fig. 1 apparatus the wavelength modulation range can be increased by moving mirrors 13 and 14 farther apart; in the Fig. 2 and the Fig. 3 wavelength selectors, the range can be increased by increasing the eccentricity of cams 22 and 28, respectively.

The modulation frequency at which the wavelength is varied back and forth depends upon the characteristics of the detector and the A.-C. amplifier. In the infra-red region of the spectrum, for example, a desirable range is between 5 and 60 cycles per second. At frequencies lower than 5 cycles per second, difficulty is encountered in providing a simple, well-stabilized A.-C. amplifier, while at frequencies above 60 cycles per second the sensitivity of the thermal detectors in common use drops appreciably.

The frequency modulated photometer is very useful for monitoring applications in process control. For such applications, it is usually preferable to monitor the slope along one side of a single absorption band. For example, with the apparatus shown in Fig. 1, the position of mirror 11 may be adjusted so that the two wave lengths of light which reach mirrors 13 and 14 are both comprised in the wave length which represents one side of the absorption band selected for monitoring. Mirror 11 then remains stationary, and the light passed through cell 20 is rapidly varied between these two wave lengths as hereinbefore described. Samples from the process may be continuously circulated through the cell 20. For standard conditions in the process, the transmission curve of the sample will have a certain slope in the selected region, and recorder 26 will indicate the value of this slope. Deviations from the standard conditions in the process which effect the slope of the transmission curve in the region selected will cause changes in the value recorded by recorder 26, whereby such deviations can be detected as soon as they occur.

In accordance with the provisions of the patent statutes, I have described the principle of my invention, together with the apparatus which I now consider to represent the best embodiment thereof; but I wish it to be understood that the apparatus described is illustrative only, and that the invention can be carried out by other means.

What I claim as new and desire to secure by Letters Patent of the United States is:

1. A frequency modulated photometer comprising a principal parabolic mirror, a second parabolic mirror facing and axially aligned with the face of the principal mirror, a source of polychromatic light, collimating means to direct light from said source to said principal mirror in parallel rays so that said rays are directed toward a first focal point by the principal mirror, a first plane mirror located substantially at said first focal point and positioned to redirect the focused rays to the principal mirror from which they are again reflected as parallel rays, a prism positioned to intercept and refract such re-reflected parallel rays and to disperse rays of different wavelengths, a second plane mirror positioned to reflect said refracted rays back through the prism to the principal mirror so that the dispersed rays are focused to form a spectrum, a wavelength selector mirror positioned to redirect rays from a single portion of said spectrum back to the principal mirror where they are again reflected as substantially parallel rays of monochromatic light along a path from the principal mirror to the second parabolic mirror, means to introduce a substance to be tested into this path, means to vibrate the wavelength selector mirror over a narrow range of the spectrum not exceeding 100 wave numbers in width to vary the wavelength of the reflected light, and a detector located at the focus of the second parabolic mirror and responsive to alternations in the intensity of rays transmitted by the substance tested.

2. A frequency modulated photometer comprising a principal parabolic mirror, a second parabolic mirror facing and axially aligned with the face of the principal mirror, a source of polychromatic light, collimating means to direct light from said source to said principal mirror in parallel rays so that said rays are directed toward a first focal point by the principal mirror, a first plane mirror located substantially at said first focal point and positioned to redirect the focused rays to the principal mirror from which they are again reflected as parallel rays, a prism positioned to intercept and refract such re-reflected parallel rays and to disperse rays of different wavelengths, a second plane mirror positioned to reflect said refracted rays back through the prism to the principal mirror so that the dispersed rays are focused to form a spectrum, a wavelength selector mirror positioned to redirect rays from a single portion of said spectrum back to the principal mirror where they are again reflected as substantially parallel rays of monochromatic light along a path from the principal mirror to the second parabolic mirror, means to introduce a substance to be tested into this path, means to vibrate the wavelength selector mirror back and forth across a portion of the spectrum to vary the wavelength of the reflected light, and a detector located at the focus of the second parabolic mirror and responsive to alternations in the intensity of rays transmitted by the substance tested.

3. A frequency-modulated photometer for providing direct indications of the slope of the light transmission versus frequency curve of a substance to be tested, comprising means to hold a sample of the substance to be tested, means to form a spectrum, a narrow mirror positioned in such spectrum to reflect light from only a single essentially monochromatic portion of the spectrum through said sample, means to move said mirror by minute amounts rapidly back and forth across a small portion of said spectrum not exceeding 100 wave numbers in width, thereby varying the wavelength of the reflected light rapidly back and forth over a correspondingly narrow range, whereby the light transmitted by said sample alternates in intensity, the amplitude of such alternations being a measure of the slope of the transmission curve of the sample within the narrow wavelength range, and a detector responsive to such alternations in intensity positioned in the path of light transmitted by said sample.

ALFRED H. CANADA.

References Cited in the file of this patent

UNITED STATES PATENTS

| Number | Name | Date |
|---|---|---|
| 2,166,824 | Runaldue | July 18, 1939 |
| 2,170,435 | Sweeney | Aug. 22, 1939 |
| 2,339,053 | Coleman | Jan. 11, 1944 |
| 2,437,323 | Heigl et al. | Mar. 9, 1948 |
| 2,439,373 | Stearns | Apr. 6, 1948 |
| 2,444,560 | Feldt et al. | July 6, 1948 |
| 2,462,946 | Coggeshall et al. | Mar. 1, 1949 |